(12) United States Patent
Hayashi et al.

(10) Patent No.: US 11,622,074 B2
(45) Date of Patent: Apr. 4, 2023

(54) ELECTRONIC APPARATUS AND ACCESSORY SYSTEM

(71) Applicant: CANON KABUSHIKI KAISHA, Tokyo (JP)

(72) Inventors: Kenichirou Hayashi, Aichi (JP); Kento Inai, Kanagawa (JP); Hiroshi Moritomo, Tokyo (JP); Hirokazu Izuoka, Kanagawa (JP); Sayaka Kumon, Tokyo (JP); Akira Matsuo, Kanagawa (JP); Sho Ichikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/129,438

(22) Filed: Dec. 21, 2020

(65) Prior Publication Data

US 2021/0195104 A1 Jun. 24, 2021

(30) Foreign Application Priority Data

Dec. 24, 2019 (JP) .............................. JP2019-232638
Jan. 21, 2020 (JP) .............................. JP2020-007825

(51) Int. Cl.
*H04N 5/232* (2006.01)
(52) U.S. Cl.
CPC .............................. *H04N 5/23241* (2013.01)
(58) Field of Classification Search
CPC ........... H04N 1/00885; H04N 1/00901; H04N 5/23241
See application file for complete search history.

(56) References Cited

U.S. PATENT DOCUMENTS

| 6,118,949 A * | 9/2000 | Ohtani | G03B 17/425 396/277 |
| 2002/0136553 A1* | 9/2002 | Kaneko | G03B 17/02 396/388 |
| 2005/0280397 A1* | 12/2005 | Iwamoto | H04N 5/23241 320/132 |
| 2005/0281554 A1* | 12/2005 | Iwasa | G03B 17/56 396/539 |
| 2008/0315840 A1* | 12/2008 | Mori | H02J 7/0047 320/136 |
| 2009/0061295 A1* | 3/2009 | Matsumoto | H01M 50/209 429/99 |

(Continued)

FOREIGN PATENT DOCUMENTS

| JP | 2013066029 A | 4/2013 |
| JP | 2015075504 A | 4/2015 |
| WO | WO-2018159113 A1 * | 9/2018 ............. G03B 17/00 |

*Primary Examiner* — Twyler L Haskins
*Assistant Examiner* — Dwight Alex C Tejano
(74) *Attorney, Agent, or Firm* — Canon U.S.A., Inc. IP Division

(57) ABSTRACT

An electronic apparatus connectable to an external electronic apparatus and storing at least one power supply for operating the external electronic apparatus includes a connection interface that is connected to the external electronic apparatus, and at least one processor configured to control the electronic apparatus. Power of the at least one power supply is supplied to the external electronic apparatus via the connection interface. The at least one processor controls the external electronic apparatus by using power received from the external electronic apparatus via the connection interface.

16 Claims, 11 Drawing Sheets

(56) References Cited

U.S. PATENT DOCUMENTS

| | | | | |
|---|---|---|---|---|
| 2013/0113417 A1* | 5/2013 | Nakashima | ............ | H02J 7/0019 320/162 |
| 2014/0132802 A1* | 5/2014 | Ohtsuka | ............. | H04N 1/00389 348/231.4 |
| 2019/0377243 A1* | 12/2019 | Chishima | ................ | G03B 17/56 |
| 2020/0106291 A1* | 4/2020 | Inai | ........................... | H02J 7/00 |
| 2020/0137253 A1* | 4/2020 | Kawataki | ............ | H04N 1/00901 |
| 2020/0329204 A1* | 10/2020 | Ohtsuka | ............. | H04N 5/23227 |

* cited by examiner

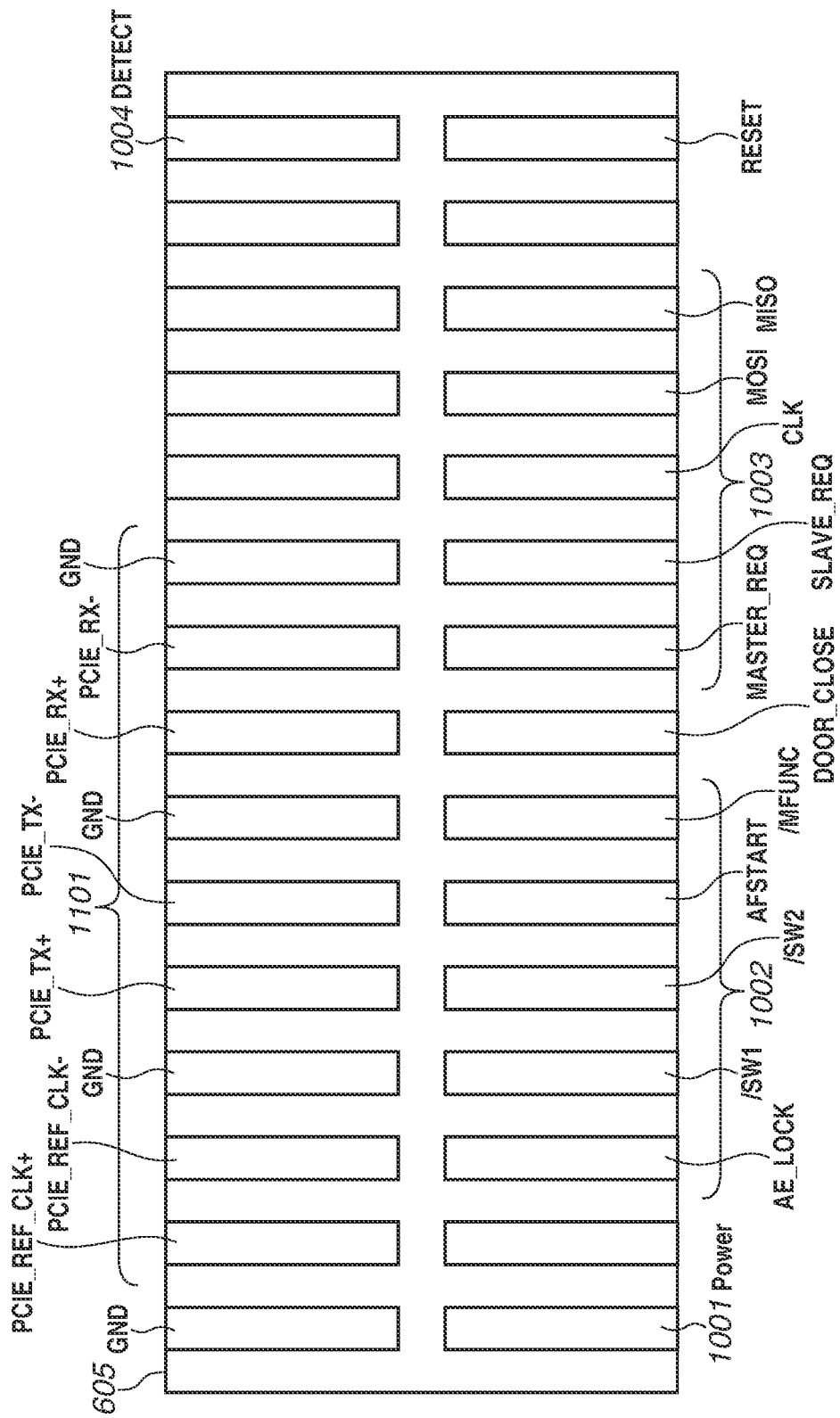

ELECTRONIC APPARATUS AND ACCESSORY SYSTEM

BACKGROUND

Field of the Disclosure

The present disclosure relates to an electronic apparatus and an accessory system.

Description of the Related Art

A battery grip has been available as an accessory device that expands operationality of an image apparatus. The battery grip can be attached to a battery box in the image apparatus. The battery grip can supply electric power to the image apparatus. When such a battery grip is attached to the image apparatus, the operationality of the image apparatus can be expanded, and an image capturing time of the image apparatus can be extended. A microcomputer is mounted on the battery grip body. The microcomputer serves to perform switching of a power source and a battery and has a charging function.

In Japanese Patent Application Laid-Open No. 2013-66029, the following technique is discussed. In such technique, when the microcomputer in the accessory device accepts a charging instruction from the image apparatus, the microcomputer exerts the charging function, and periodically checks with the image apparatus regarding a charging instruction.

Further, Japanese Patent Application Laid-Open No. 2015-75504 discusses a technique in which a signal for detecting connection of the accessory device to the image apparatus is arranged at an end portion inside a connector so as to ensure connection timing between the image apparatus and the accessory device.

SUMMARY

According to an aspect of the present disclosure, an electronic apparatus connectable to an external electronic apparatus and storing at least one power supply for operating the external electronic apparatus includes a connection interface that is connected to the external electronic apparatus, and at least one processor configured to control the electronic apparatus. Power of the at least one power supply is supplied to the external electronic apparatus via the connection interface. The at least one processor controls the external electronic apparatus by using power received from the external electronic apparatus via the connection interface.

Further features of the present disclosure will become apparent from the following description of exemplary embodiments with reference to the attached drawings.

BRIEF DESCRIPTION OF THE DRAWINGS

FIG. 11 is a diagram illustrating an arrangement example of connector pins in the accessory device according to one or more aspects of the present disclosure.

DESCRIPTION OF THE EMBODIMENTS

Figure 1:
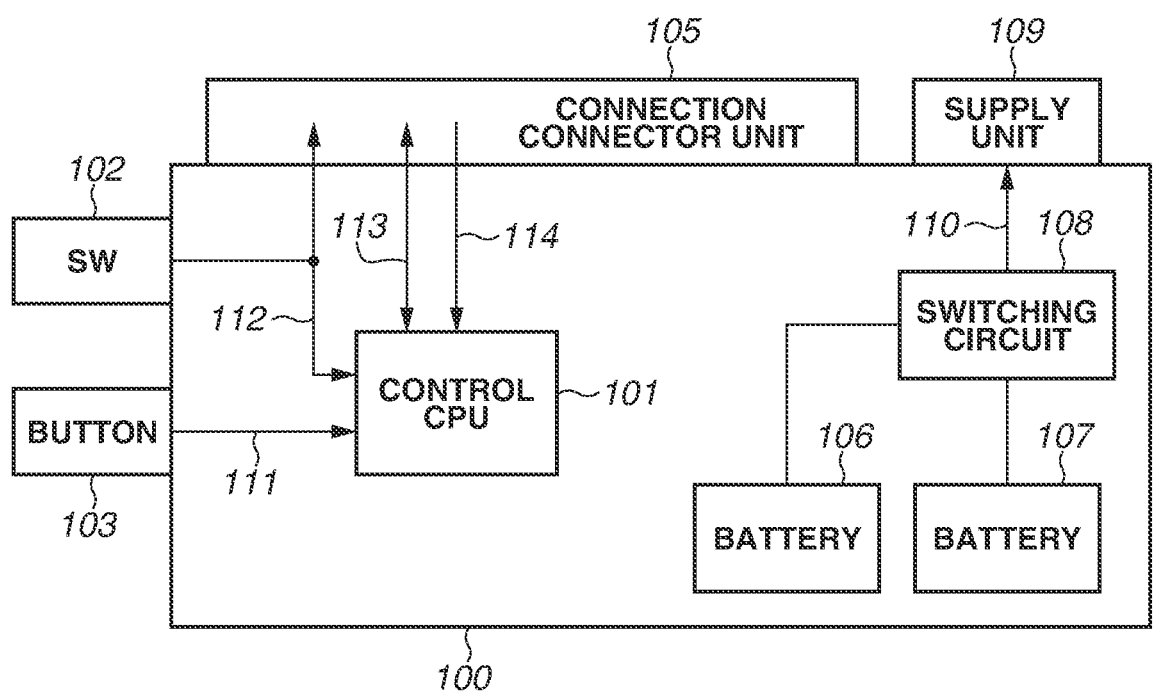
FIG. 1 is a block diagram illustrating a configuration example of an accessory device according to one or more aspects of the present disclosure.

A detailed description will hereinafter be made on exemplary embodiments according to the present disclosure with reference to the accompanying drawings. In the following description on the exemplary embodiments, the same configuration, operation, and processing will each be denoted by the same reference number in the drawings. In the exemplary embodiments, an accessory device that can be attached to an electronic apparatus will be described using a battery grip as an example. The battery grip is an accessory device that can supply power to an image apparatus from a battery installed in the accessory device when connected to the image apparatus. In addition, a digital camera as an electronic apparatus will be described as an example of the image apparatus. Each of the accessory device and the image apparatus in the present exemplary embodiments is merely an example, and the present disclosure is not limited thereto.

Hereinafter, a description will be made on an accessory device 100 according to a first exemplary embodiment of the present disclosure with reference to a block diagram in FIG. 1. FIG. 1 is a block diagram illustrating a configuration example of the accessory device 100 according to the first exemplary embodiment. The accessory device 100 has a control central processing unit (CPU) 101.

The control CPU 101 controls the entire accessory device 100 via a bus, and executes a program stored in a non-volatile memory (not illustrated) to realize each processing that will be described below in the first exemplary embodiment.

A switch (SW) 102 is a switch button that is provided to the accessory device, and generates an imaging preparation signal SW1 and an imaging signal SW2. A signal line 112 is a signal line through which a switch signal is transmitted. The switch signal is transmitted to an image apparatus 200 via a connection connector unit 105. The switch signal can also be transmitted to the control CPU 101 in the accessory device 100 simultaneously.

A button 103 is an operation member that is provided to change settings of the image apparatus 200. For example, the button 103 is a dial button. A signal line 111 is a signal line that responds to a dial button operation. For example, immediacy is not required for the dial button operation in imaging. Thus, a control signal for the dial button operation is first transmitted to the control CPU 101 in the accessory device 100. The control CPU 101 then transmits the control signal to the image apparatus 200 via a communication line 113 and the connection connector unit 105.

The connection connector unit 105 is a connection connector that connects the accessory device 100 and the image apparatus 200, which will be described below, and is used to exchange signals and for communication between the accessory device 100 and the image apparatus 200. The communication line 113 only needs to be an interface that is used for general control. In the first exemplary embodiment, a Serial Peripheral Interface (SPI) is used as the communication line 113. Consequently, a signal for which immediacy is not required for control of the image apparatus 200, such as a dial button operation signal for a menu setting, is superposed on a low-speed signal line. As a result, the number of limited connector pins can be reduced.

The accessory device 100 houses two batteries (batteries 106 and 107). In the present exemplary embodiment, although the two batteries are installed, power from only one of the two batteries is supplied to the image apparatus 200 via a supply unit 109.

A switching circuit 108 is connected to the batteries 106 and 107, and switches between the batteries 106 and 107 for the supply of power to the image apparatus 200. A power supply line 110 that is switched by the switching circuit 108 is a power supply line through which power is supplied to the image apparatus 200 via the supply unit 109.

The supply unit 109 supplies power from the battery 106 or the battery 107 to the image apparatus 200.

Differing from the power supply line 110, the power supply line 114 is a power supply line through which power is supplied from the image apparatus 200. Power is supplied from the image apparatus 200 to the accessory device 100 via the connection connector unit 105.

Figure 10:
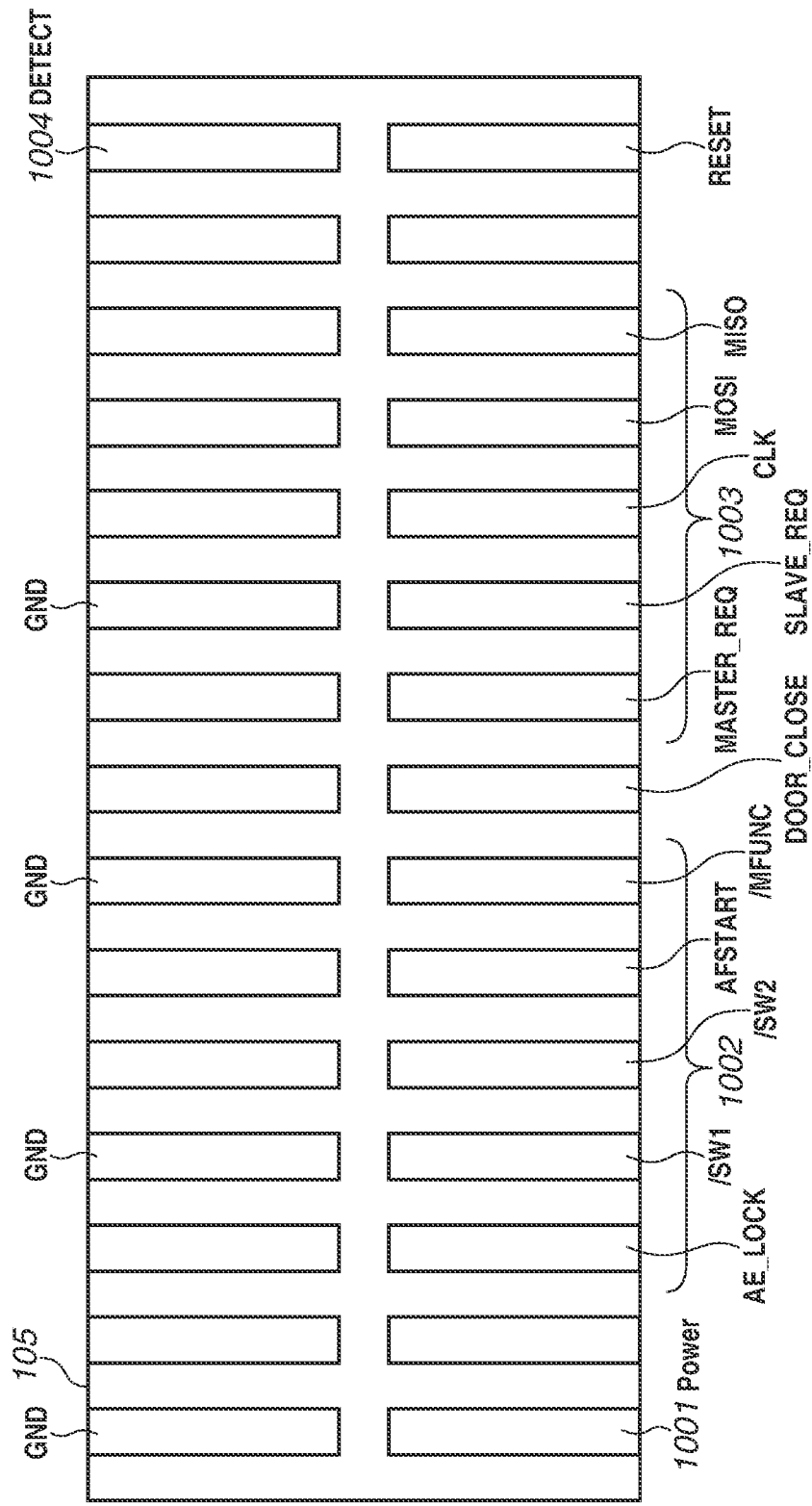
FIG. 10 is a diagram illustrating an arrangement example of connector pins in the accessory device according to one or more aspects of the present disclosure.

Here, a description will be made on arrangement of the connector pins (terminals) in the connection connector unit 105, which is illustrated in FIG. 1, with reference to FIG. 10. FIG. 10 is a diagram illustrating an arrangement example of the connector pins in the accessory device 100 according to the first exemplary embodiment.

Signal lines in a signal line group 1002 are each a signal line that communicates a signal, for which immediacy is required, to the image apparatus 200. These signal lines are directly connected to the signal line 112 illustrated in FIG. 1.

The signal, for which immediacy is required, is a signal related to imaging preparation control or imaging control, such as the imaging preparation signal (SW1), the imaging signal (SW2), a focusing start signal (AFSTART), an exposure lock signal (AELOCK), and a function button (Multi-Function). For example, in a power-saving mode of the image apparatus 200, when the imaging preparation signal (SW1) is generated based on a user's operation of the SW 102, the signal is directly transmitted to the image apparatus 200. Then, the image apparatus 200 immediately returns from the power-saving mode to prepare for imaging. The signal line 112 includes a plurality of signal lines for communicating the respective signals.

Each signal line in a signal line group 1003 is an SPI signal line used for digital communication between the image apparatus 200 and the accessory device 100, and is connected to the communication line 113. In SPI communication from the accessory device 100, the control CPU 101 converts a control signal, for which immediacy is not required compared to the above-described signals, into a signal for the SPI communication, and communicates such a signal to the image apparatus 200. Such control signals include operation, such as the dial button operation for changing a setting value of the image apparatus 200. The communication line 113 includes a plurality of signal lines for communicating such signals as a clock signal (SCLK), Master Out/Slave In (MOSI), Master In/Slave Out (MISO), a service request signal (SREQ), and a memory request signal (MREQ).

In such a manner, the control signal for which immediacy is not required in imaging is converted into a signal to be communicated via the control CPU 101, and signals having specified functions are superposed on the low-speed signal line and communicated. As a result, such control signals as above can be communicated by using the limited connector pins in the connection connector unit 105.

A power supply line 1001 is a power supply line that power is supplied from the image apparatus 200, and is connected to the power supply line 114.

The image apparatus 200 uses a detection pin 1004 to detect attachment of the accessory device 100.

Figure 2:
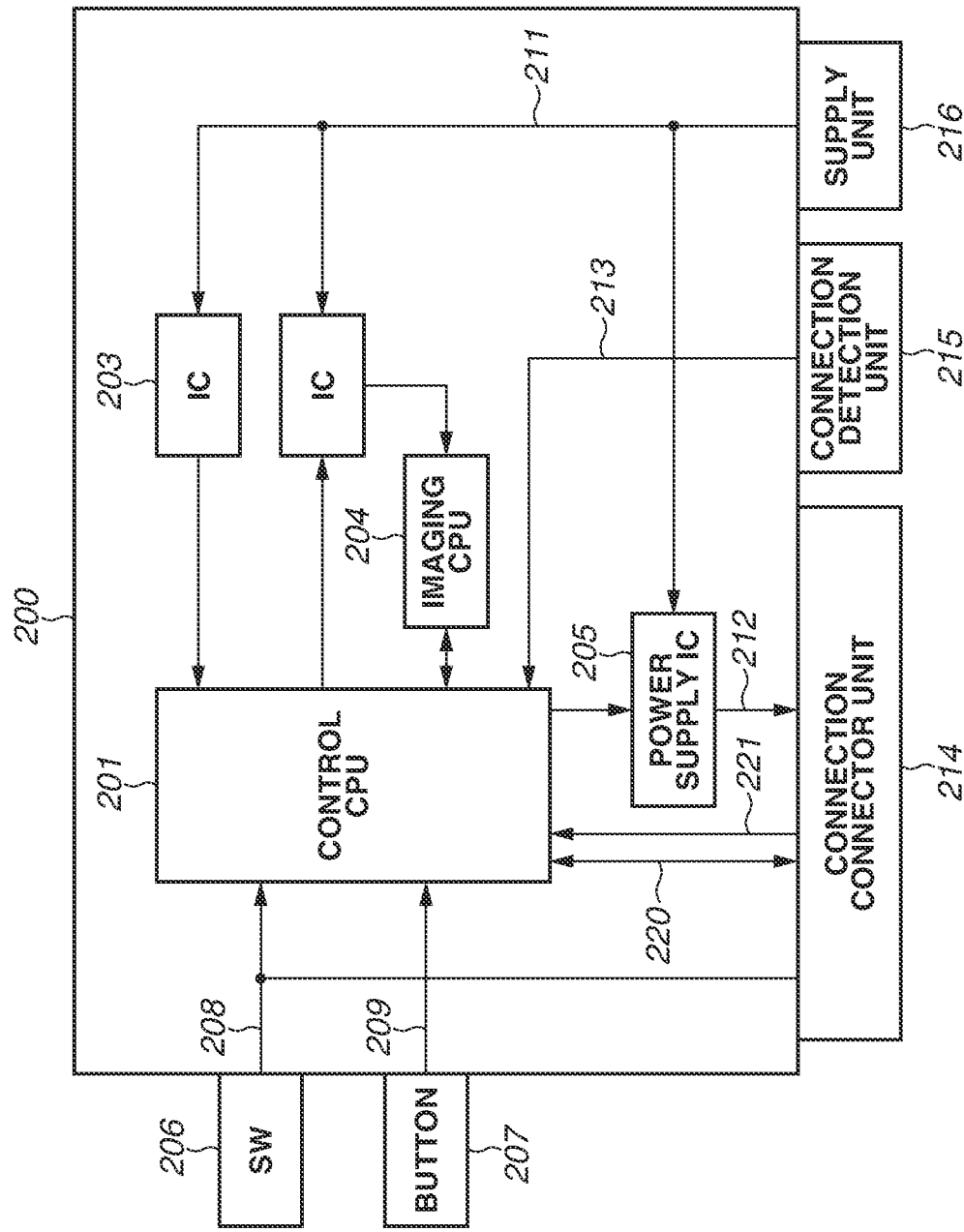
FIG. 2 is a block diagram illustrating a configuration example of an image apparatus according to one or more aspects of the present disclosure.

Next, a description will be made on the image apparatus 200 to which the accessory device 100 is connected with reference to a block diagram in FIG. 2. FIG. 2 is a block diagram illustrating a configuration example of the image apparatus 200 according to the present exemplary embodiment.

A control CPU 201 controls the entire image apparatus 200 via a bus, and executes a program stored in a non-volatile memory (not illustrated) to realize each processing that will be described below in the present exemplary embodiment.

An integrated circuit (IC) 203 is a power-control IC (power supply block) that generates power for driving the control CPU 201. The IC 203 is configured such that the control CPU 201 is kept to be turned on while power is supplied to a power supply line 211 of the image apparatus 200.

An imaging CPU 204 controls an imaging unit (not illustrated) included in the image apparatus 200 to capture and generate an image of an object. The imaging unit includes a lens group, an imaging device, an A/D conversion unit, and an image processing unit. The imaging unit generates image data from an object image incident via the lens group. The imaging device includes, for example, a charge-coupled device (CCD) sensor and a complementary metal-oxide semiconductor (CMOS) sensor. The imaging device captures an object image in response to an instruction from the SW 102 or a SW 206, and outputs the captured image. The imaging CPU 204 may be a part of the control CPU 201.

A power supply IC 205 is a power supply block that generates a suitable voltage level to be supplied to a power supply line 212. The control CPU 201 controls of turning on and off the power supply IC 205. The power supply line 212 is a power supply line through which power is supplied from the image apparatus 200 to the accessory device 100. The power supply line 212 is connected to the power supply line 114 via a connection connector unit 214 and the connection connector unit 105.

The SW 206 is a switch button for generating an imaging preparation signal and an imaging instruction signal. A signal line 208 is a signal line to which the switch signal is notified. The signal line 208 is connected to the signal line 112 via the connection connector units 214 and 105.

A button 207 is provided to change the settings of the image apparatus 200. A signal line 209 is a signal line that responds to a dial button operation.

The connection connector unit 214 is a connection connector that is used to exchange signals and for communication with the accessory device 100.

A connection detection unit 215 detects the attachment of the accessory device 100 to the image apparatus 200. In the accessory device 100, the detection pin 1004, which is illustrated in FIG. 10, is connected to ground (GND). The connection detection unit 215 according to the first exemplary embodiment detects the attachment of the accessory device 100 when a signal line 213 that is pulled up in the image apparatus 200 detects contact with a GND line in the accessory device 100. However, the configuration of the connection detection unit 215 is not limited thereto. The connection detection unit 215 may mechanically detect the attachment of the accessory device based on a button signal, or may detect an approach of the accessory device in a similar manner to a Hall effect device.

A supply unit 216 is a power supply connector for receiving power supplied from the accessory device 100 via the supply unit 109. The power supply line 211 is electrically connected to the above-described power supply line 110 via the supply units 216 and 109. The supply unit 216 may be integrated with a battery box, which is not illustrated, and be able to supply power to the power supply line 211 when a battery is installed in the battery box. In the present exemplary embodiment, at least a part of the accessory device 100 is inserted in the battery box, which is not illustrated, in the image apparatus 200. In this way, the accessory device 100 is attached to the image apparatus 200.

A communication line 220 is a communication line through which the control CPU 201 communicates with the control CPU 101 in the accessory device 100. The communication line 220 is connected to the communication line 113 in the accessory device 100 via the connection connector units 214 and 105. As described above, the SPI is used for the communication line 220 in the present exemplary embodiment.

A signal line 221 is a signal line for outputting a connection detection signal that is generated in the connection connector unit 214 for detecting connection between the image apparatus 200 and the accessory device 100. In addition to the above-described connection detection unit 215, the connection connector unit 214 also detects whether the connector has been connected correctly.

In a camera system according to the first exemplary embodiment that includes the accessory device 100 and the image apparatus 200, the image apparatus 200 is operated by the IC 203 supplying power to the power supply line 211. Next, when the connection detection unit 215 detects the attachment of the accessory device 100, power is supplied to the accessory device 100 by using the power supply line 212.

Thus, the accessory device 100 being operated means that power is being supplied to the image apparatus 200. With such a configuration, even in a state where the image apparatus 200 is operating in the power-saving mode, the image apparatus 200 can return from the power-saving mode by operation on the SW 102 of the accessory device 100.

The image apparatus 200 can also be equipped with a battery therein. Thus, in the case where the image apparatus 200 is not connected to the accessory device 100 that is equipped with a battery, the image apparatus 200 can be driven by using the battery (not illustrated), which is installed in the image apparatus 200, as a power supply.

A detailed description will be made on operation flows of the accessory device 100 and the image apparatus 200 according to the first exemplary embodiment with reference to FIG. 3 and FIG. 4.

Figure 3:
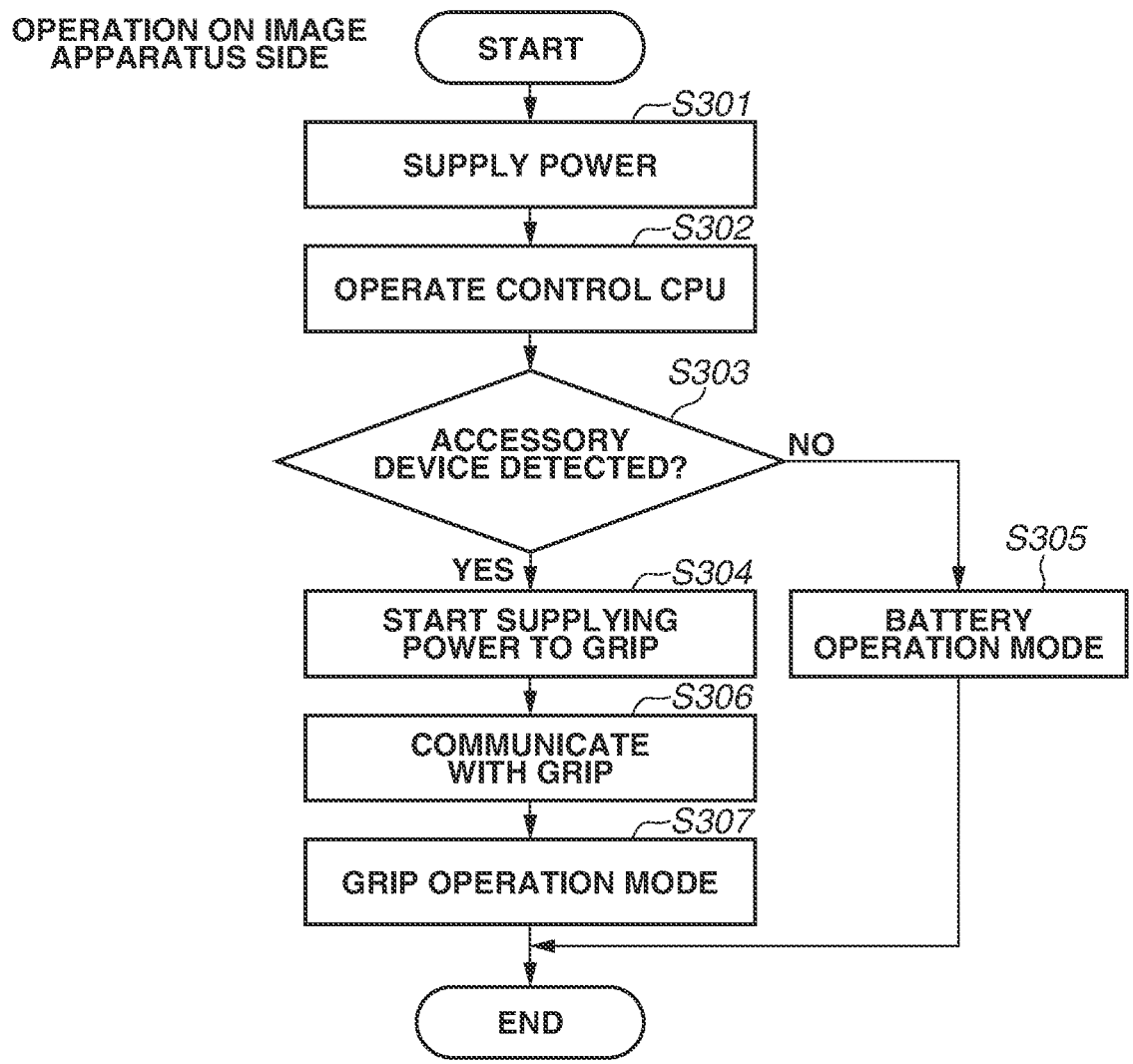
FIG. 3 is a flowchart illustrating an example of operation of the image apparatus according to one or more aspects of the present disclosure.

FIG. 3 is a flowchart illustrating an example of an operation flow of the image apparatus 200 according to the first exemplary embodiment. Each process in the flowchart illustrated in FIG. 3 is realized when the control CPU 201 loads and executes the program, which is stored in an unillustrated non-volatile memory and controls each function block.

In step S301, the flow of processes is initiated when power is supplied to the power supply line 211 of the image apparatus 200 via the supply unit 216.

In step S302, the IC 203 is turned on when power is supplied to the power supply line 211. Then, the control CPU 201 starts operating with the supplied power.

In step S303, the control CPU 201 checks whether the device that has been connected to the connection detection unit 215 is the accessory device 100. In other words, the control CPU 201 determines whether a type of the device that has been connected to the connection detection unit 215 is an accessory device. If the device that has been connected to the connection detection unit 215 is the accessory device 100 (YES in step S303), the processing proceeds to step S304. If not (NO in step S303), the processing proceeds to step S305.

In step S304, the power supply IC 205 is turned on when the connection of the accessory device 100 is detected. Then, power is supplied to the accessory device 100. As the line through which power is supplied from the image apparatus 200 to the accessory device 100, a power supply line provided in the connection connector unit 214 is used.

If the connection of the accessory device 100 is not detected (NO in step S303), then in step S305, it is determined that the battery is connected to the image apparatus 200 as a power supply destination, and the image apparatus 200 is shifted to a battery operation mode. In the case where the connection of the accessory device 100 is not detected, this processing flow is terminated in step S305.

In step S306, the image apparatus 200 starts communicating with the accessory device 100, to which power is supplied, via the communication line 220. At this time, initial communication is carried out to check the type of the accessory device 100, for example. The type of the accessory device 100 is information with which it is possible to determine what function the accessory device has, such as information indicating whether the accessory device is a battery grip or a Wireless File Transmitter (WFT) having a communication function, which will be described below. Here, it is assumed that the type of the connected accessory device in step S306 is a battery grip.

In step S307, the image apparatus 200 is shifted to a battery grip operation mode. The battery grip operation mode is, for example, a mode in which the image apparatus is operated when being supplied with the power from the battery grip. The image apparatus 200 checks whether the battery in the battery grip is a authenticable battery. If the battery is not a authenticable battery, the image apparatus 200 displays a message indicating that the battery is not authorized to warn a user that the battery cannot be charged via the camera or a Universal Serial Bus (USB). Then, the image apparatus 200 detects whether batteries are installed on both of right and left sides. According to a detection result, the image apparatus 200 displays a remaining battery capacity on a display unit (not illustrated) of the image apparatus 200. In addition, the image apparatus 200 can be operated by operating an operation member such as a button on the battery grip.

The image apparatus 200 can start communicating with the accessory device 100 after determining that the accessory device 100 is appropriately attached by executing the processing in steps described so far.

Figure 4:
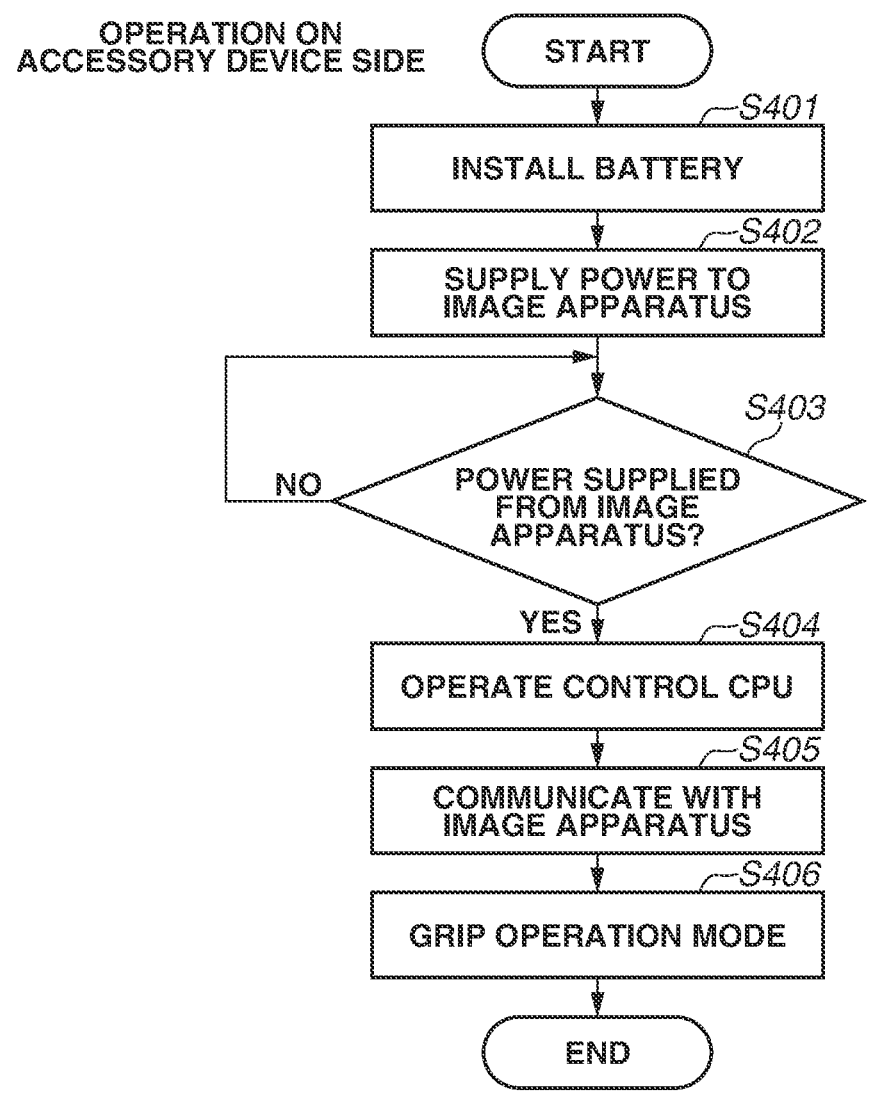
FIG. 4 is a flowchart illustrating an example of operation of the accessory device according to one or more aspects of the present disclosure.

FIG. 4 is a flowchart illustrating an example of an operation of the accessory device according to the first exemplary embodiment. An initial operation in the flowchart illustrated in FIG. 4 is realized based on the control by the switching circuit 108 and transition of the state of the switch 102. The processes in step S404 and subsequent steps after the control CPU 101 is activated are realized by the control CPU 101 loading and executing the program, which is stored in the unillustrated non-volatile memory and controlling each function block.

In step S401, the batteries are installed in the accessory device 100, and the flow of processing is then initiated.

In step S402, power is supplied from the battery 106 or the battery 107 to the image apparatus 200 via the supply unit 109. Although not illustrated in the operation flow in FIG. 4, the switching circuit 108 selects one of the two batteries 106 and 107 as a power supply at the time when the two batteries 106 and 107 are installed in the accessory device 100. The switching circuit 108 may be configured to, for example, detect the remaining battery capacity of each of the batteries 106 and 107 and select the battery with a larger remaining capacity.

In step S403, in the above state, the accessory device 100 is shifted to a state of waiting for power supply from the image apparatus 200 via the connection connector unit 105. The state of the accessory device 100 transitions according to the presence or absence of the power supply from the image apparatus 200. If power is supplied (YES in step S403), the processing proceeds to step S404. If not (NO in step S403), the accessory device 100 remains in the state of waiting for power supply from the image apparatus 200.

If power is supplied from the image apparatus 200, then in step S404, the control CPU 101 in the accessory device 100 starts being operated with the power supply.

In step S405, the control CPU 101 carries out the initial communication with the image apparatus 200 via the communication line 113 to transmit model information including the type of the accessory device 100, and the like.

When the initial communication with the image apparatus 200 is completed, then in step S406, the accessory device 100 is shifted to a state of being driven in the battery grip operation mode.

As it has been described so far, in the camera system according to the first exemplary embodiment that includes the accessory device 100 and the image apparatus 200, the accessory device 100 is not operated only by installment of the batteries 106 and 107. The power source of the accessory device 100 is supplied from the image apparatus 200 via the connection connector unit 105. That is, the accessory device 100 supplies power to the image apparatus 200 via the supply unit 109, and the image apparatus 200 that has responded to the supplied power supplies power to the accessory device 100 via the connection connector unit 214. In this way, the control CPU 101 starts being operated.

As described above, the operation power of the accessory device 100 loops back from the image apparatus 200 to the accessory device 100. Thus, even in the case where the connector connection timings do not coincide between the image apparatus 200 and the accessory device 100, it is possible to prevent the difference in state between the image apparatus 200 and the accessory device 100.

The accessory device 100 according to the first exemplary embodiment can be connected to any image apparatus as long as the power supply specification, the arrangement of the connector pins in the connection connector unit 105, and a mechanical layout of the supply unit 109 match the foregoing. However, even in the case where the mechanical connector connection of the accessory device 100 with the image apparatus 200 is established, there is a possibility that, the accessory device 100, of which the operation is not supported, may be attached to the image apparatus 200.

Figure 5:
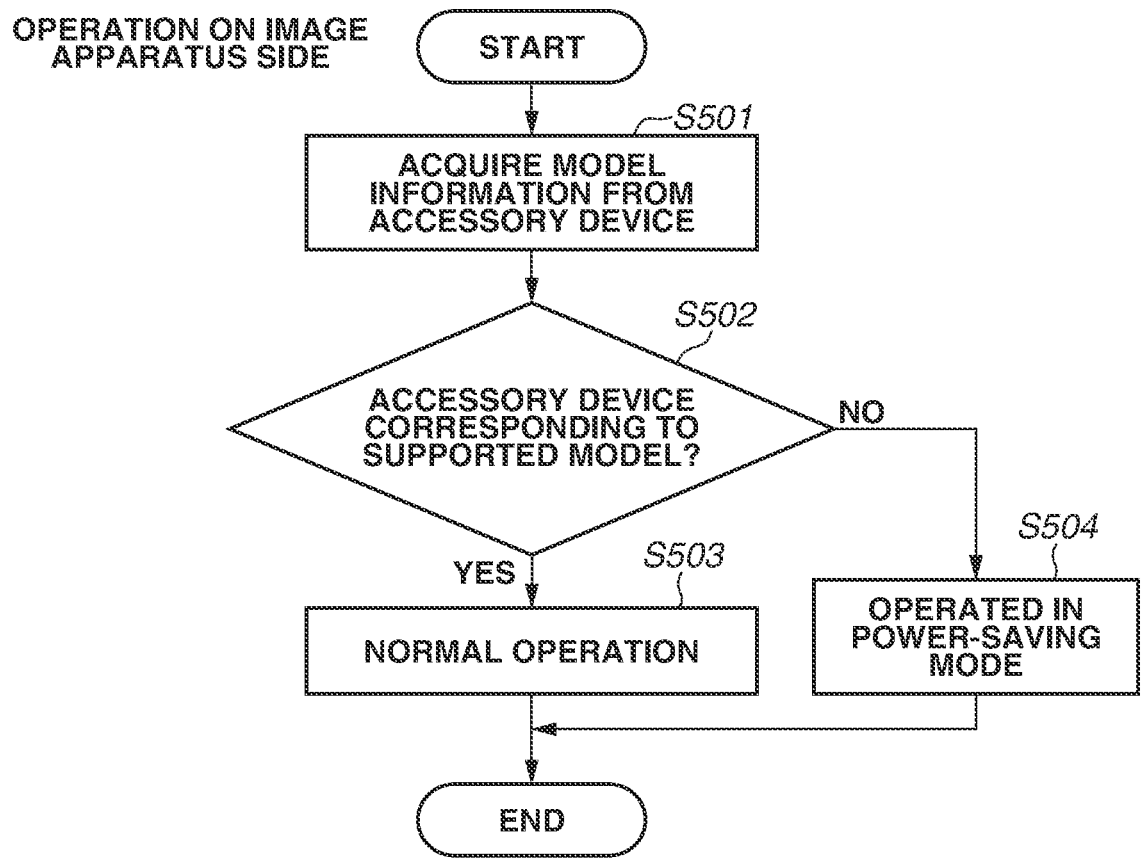
FIG. 5 is a chart illustrating an example of operation of the image apparatus according to one or more aspects of the present disclosure.

In such a case, the image apparatus 200 notifies the user of attachment of an unsupported accessory device 100 on the condition that the attached accessory device 100 does not operate. With reference to FIG. 5, a description will be made on an operation flow to be executed at the time when an unsupported accessory device 100, of which the operation is not supported by the image apparatus 200, is attached to the image apparatus 200.

FIG. 5 is a flowchart illustrating an example of an operation flow of the image apparatus 200 according to the first exemplary embodiment. The flow of processing illustrated in FIG. 5 is initiated when the above-described process in step S304 is completed, and the image apparatus 200 is brought into the state of being capable of communicating with the control CPU 101 in the accessory device 100. Each process illustrated in the flowchart in FIG. 5 is realized when the control CPU 201 loads and executes the program, which is stored in the unillustrated non-volatile memory, and controls each function block.

In step S501, the image apparatus 200 acquires the model information including the type of the accessory device from the accessory device 100.

Then, in step S502, the image apparatus 200 determines whether the model information corresponds to one of supported models. If the accessory device in the model information is an accessory device supported by the image apparatus 200 (YES in step S502), the processing proceeds to step S503. If the accessory device in the model information is not an accessory device supported by the image apparatus 200 (NO in step S502), the processing proceeds to step S504.

If the accessory device 100 is supported by the image apparatus 200 (YES in step S502), the processing proceeds to step S503. Then, in step S503, the image apparatus 200 can capture images in the state where the accessory device 100 is attached.

On the other hand, if the image apparatus 200 determines that the attached accessory device is not supported by the image apparatus 200 (NO in step S502), then in step S504, the image apparatus 200 is shifted to the power-saving mode in the state where power is supplied from the accessory device 100. As a result, the image apparatus 200 is brought into a state of being incapable of capturing images. In the case where an error display unit is provided on the image apparatus 200 or the accessory device 100, an error notification that an unsupported accessory device is attached may be displayed on the error display unit.

As it has been described so far, according to the first exemplary embodiment of the present disclosure, the number of the limited connector pins can be reduced by superposing the signals such as the button operation signal for the menu setting, for which immediacy is not required for the control of the image apparatus 200, on the low-speed signal line.

Furthermore, in the accessory system including the accessory device 100 and the image apparatus 200 which has been described in the present exemplary embodiment, the power supplied from the accessory device 100 loops back from the image apparatus 200 to operate the accessory device 100. With such a configuration, it is possible to prevent an erroneous operation caused by a difference in the connector connection timing.

In the first exemplary embodiment, the description has been made on the configuration in which, in a case where an unsupported accessory device, of which the operation is not supported, is attached to the image apparatus, the image apparatus is brought into the power-saving mode where the image apparatus does not operate. It is also possible for the image apparatus to perform operation to expand the function of the image apparatus according to the connected accessory device by employing a similar mechanism.

A description will hereinafter be made on a configuration, in which an image apparatus 700 according to a second exemplary embodiment of the present disclosure expands a function thereof, with reference to the drawings.

Figure 6:
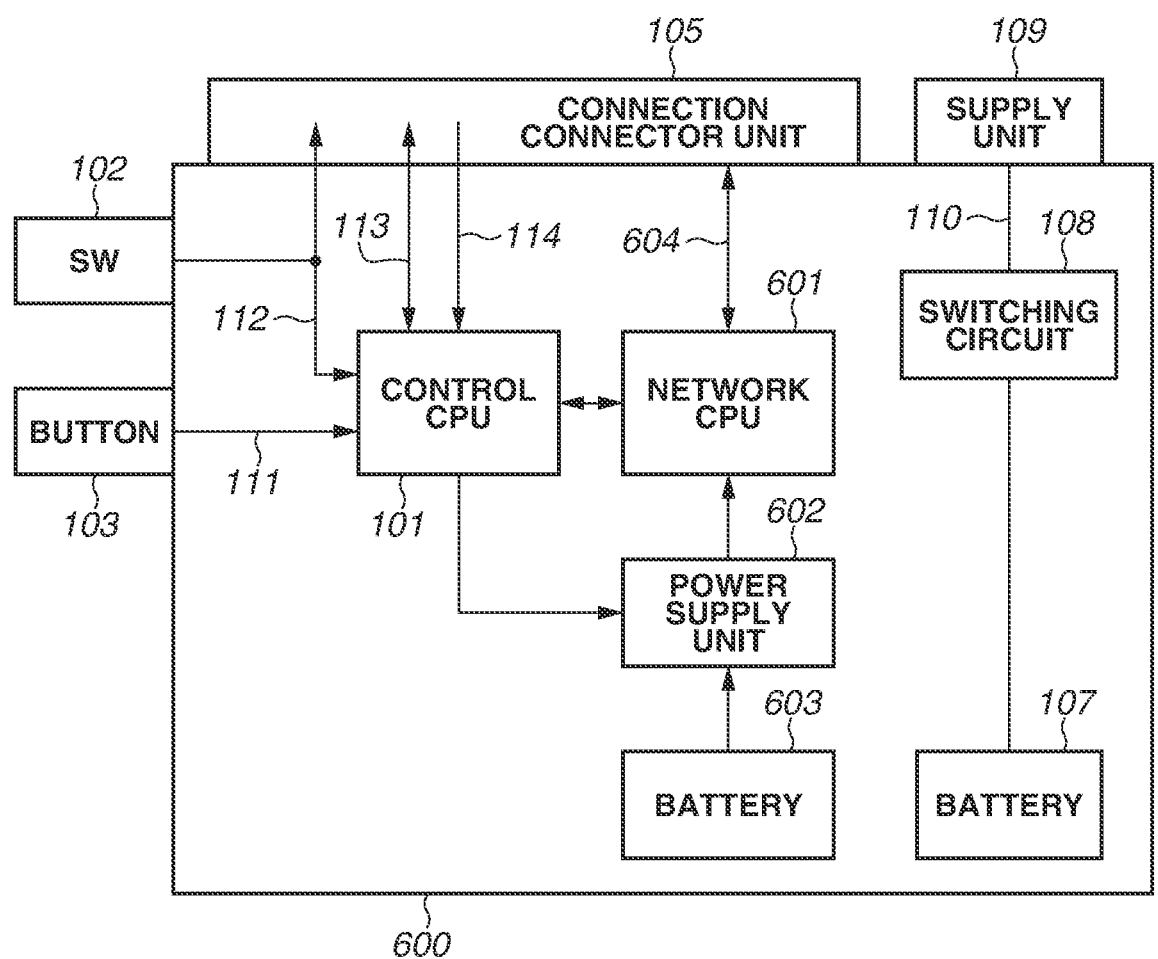
FIG. 6 is a block diagram illustrating a configuration example of an accessory device according to one or more aspects of the present disclosure.

FIG. 6 is a block diagram illustrating a configuration example of an accessory device 600 according to the second exemplary embodiment. Differing from the accessory device 100 that has been described in the first exemplary embodiment, the accessory device 600 according to the second exemplary embodiment has a network communication function. The description on the blocks that have already been described with reference to the configuration in FIG. 1 will be omitted.

The accessory device 600 has a network CPU 601 that is a CPU executing network control. A high-speed signal line 604 is a signal line that is used when the network CPU 601 communicates with the image apparatus 700. In view of the circumstances where high-speed networks have been developed in recent years, a Peripheral Component Interconnect (PCI) Express with high execution throughput is used as the high-speed signal line 604 in the second exemplary embodiment. The high-speed signal line 604 is connected to the image apparatus 700 via the connection connector unit 105.

A power supply unit 602 is a power supply block that supplies desirable power to the network CPU 601. The power supply unit 602 is controlled by the control CPU 101. A battery 603 is installed in the accessory device 600, and supplies power exclusively to a network function block.

In the second exemplary embodiment, a scalable PCI Express (high-speed signal line) is arranged at a connector pin in the connection connector unit 105.

A detailed description will be made on how the PCI Express is arranged with reference to FIG. 11. FIG. 1 is a diagram illustrating an arrangement example of connector pins (terminals) in the accessory device 600 according to the second exemplary embodiment. The blocks that have already been described with reference to FIG. 1 and FIG. 10 will not be described here. A signal line group 1101 illustrates an arrangement example of the connector pins including the above-described PCI Express.

In the first exemplary embodiment, the number of limited connector pins is reduced by superposing the signals such as the button operation signal for the menu setting, for which immediacy is not required for the control of the image apparatus, on the low-speed signal line. With the configuration, the PCI Express is arranged at a connector terminal that can be used for another application. The signal line group 1101 is connected to the high-speed signal line 604.

Examples of the high-speed signal line 604 (PCI Express) include REFCLK± (a clock), Tx± (a transceiver), Rx± (a receiver), and PRESET.

The PCI Express is known as a scalable interface. In the present exemplary embodiment, a high-speed PCI Express is used as a communication line that transfers image information generated by the image apparatus 700, which will be described below, to the accessory device 600. In the present exemplary embodiment, the communication of the accessory device having the network function will be described as an example. However, an accessory device having a storage function can also be connected to the image apparatus as long as the accessory device carries out the communication using a PCI Express.

Figure 7:
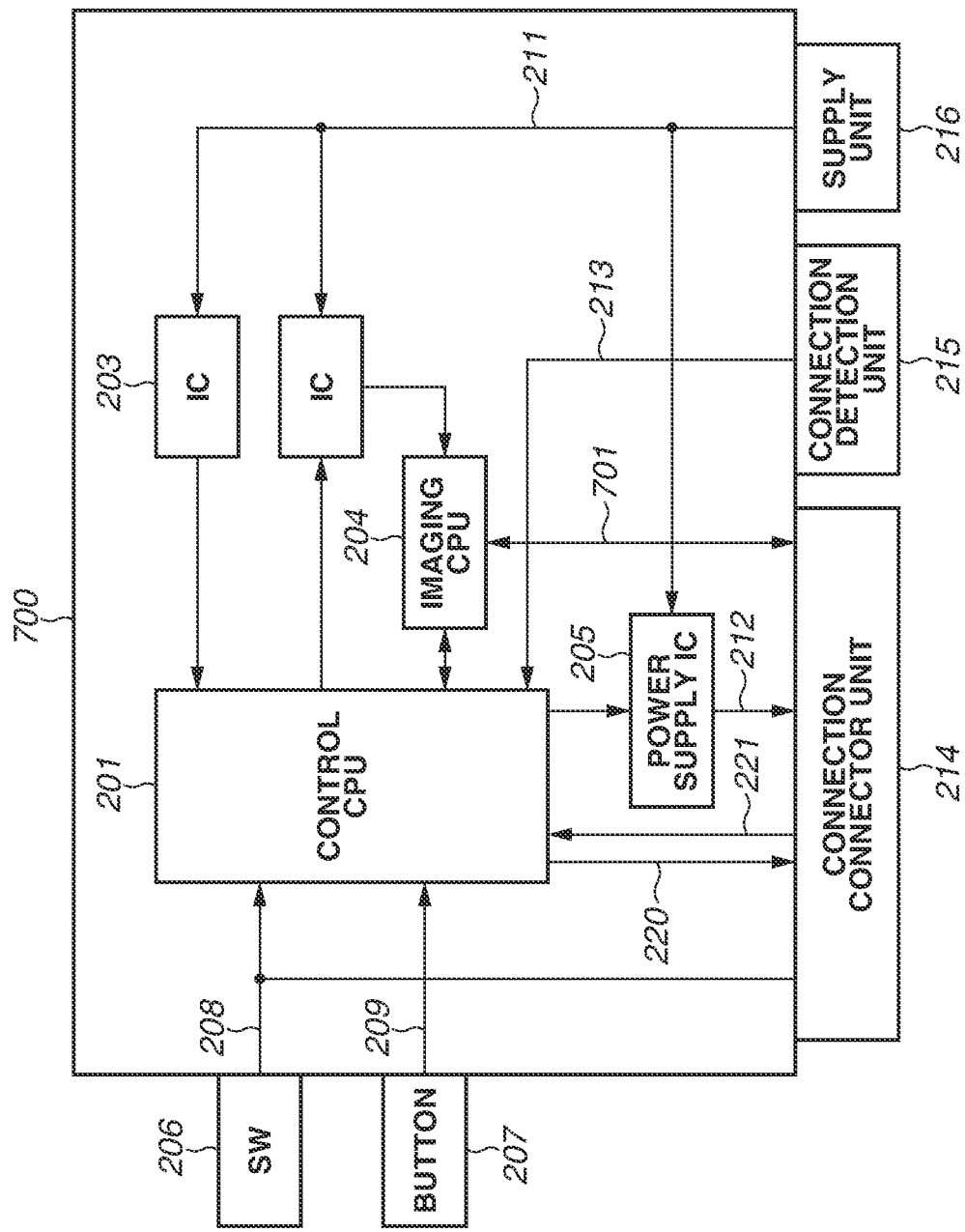
FIG. 7 is a block diagram illustrating a configuration example of an image apparatus according to one or more aspects of the present disclosure.

FIG. 7 is a block diagram illustrating a configuration example of the image apparatus 700 according to the second exemplary embodiment.

The image apparatus 700 has a high-speed communication line 701. The high-speed communication line 701 refers to a high-speed signal line through which the image information is transferred to the accessory device 600. The high-speed communication line 701 is connected to the accessory device 600 via the connection connector unit 214, and is thus connected to the high-speed signal line 604. In the second exemplary embodiment, the PCI Express is used as a high-speed signal line.

Figure 8:
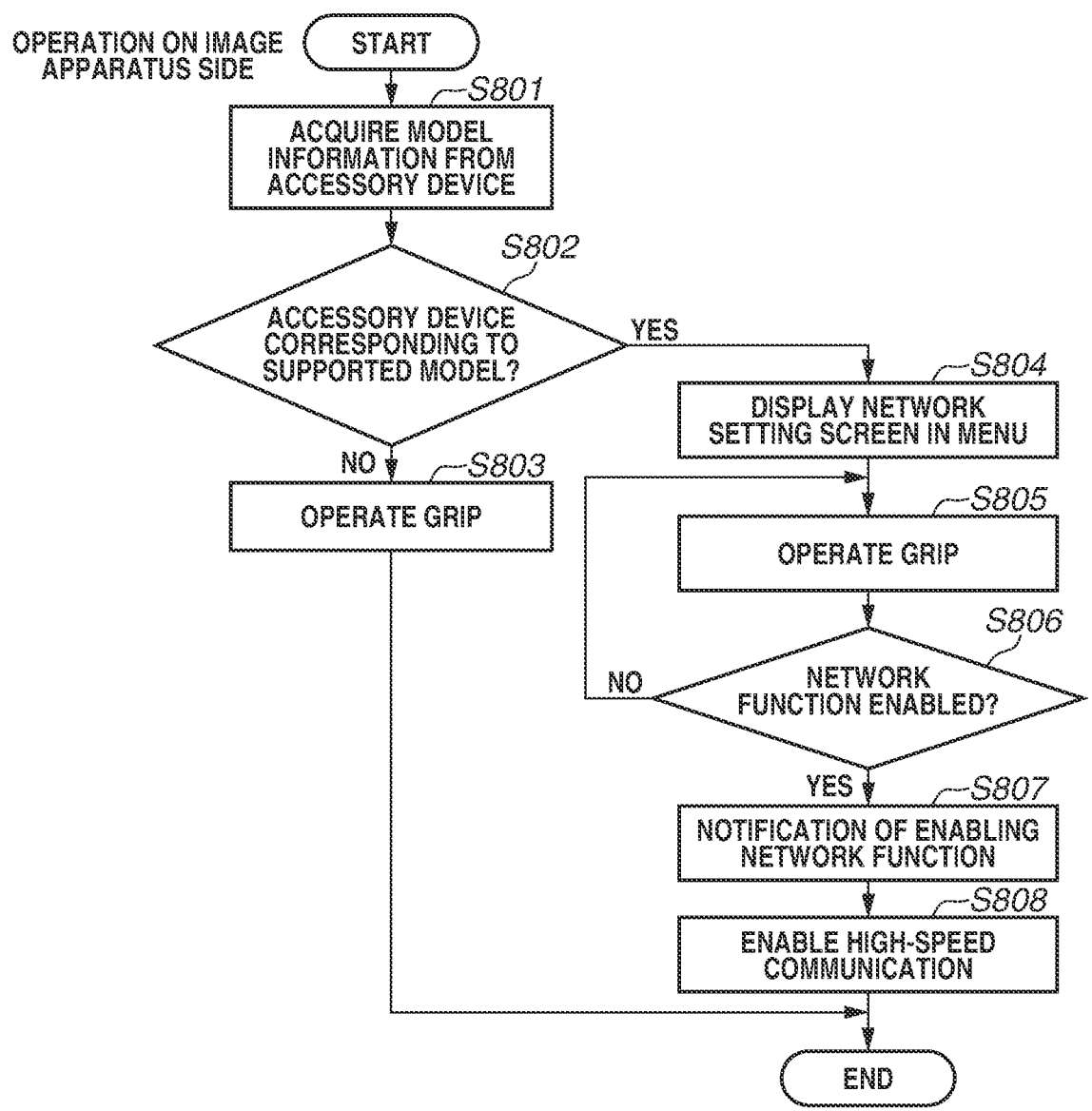
FIG. 8 is a flowchart illustrating an example of operation of the image apparatus according to one or more aspects of the present disclosure.

Next, a description will be made on operation of the image apparatus 700 in the second exemplary embodiment with reference to a flowchart in FIG. 8. FIG. 8 is a flowchart illustrating an example of an operation flow of the image apparatus according to the second exemplary embodiment. Each process illustrated in the flowchart in FIG. 8 is realized by the control CPU 201 loading and executing the program, which is stored in the unillustrated non-volatile memory, and controlling each function block. The flow in FIG. 8 is initiated when the process in step S304 illustrated in FIG. 3 is completed, and the image apparatus 700 is brought into the state of being capable of communicating with the control CPU 101 in the accessory device 600.

In step S801, the image apparatus 700 acquires model information including the type of the accessory device from the accessory device 600.

In step S802, it is determined, on the basis of the acquired information, whether the connected accessory device 600 is an accessory device that expands the network function. If the connected accessory device 600 is the accessory device that expands the network function (YES in step S802), the processing proceeds to step S804. If the connected accessory device 600 is not the accessory device that expands the network function (NO in step S802), the processing proceeds to step S803.

If the connected accessory device 600 is not the accessory device that expands the network function (NO in step S802), then in step S803, the image apparatus 700 recognizes the accessory device 600 as a battery grip and performs a corresponding operation.

On the other hand, if the connected accessory device 600 is the accessory device that expands the network function (YES in step S802), then in step S804, the image apparatus 700 displays a network setting screen on a display unit, which is not illustrated. Then, the processing proceeds to step S805.

In step S805, the connected accessory device 600 is used as a battery grip.

In step S806, it is determined whether the network function of the accessory device 600 is enabled. If the network function of the accessory device 600 is not enabled (NO in step S806), the accessory device 600 is recognized and operated as a battery grip until a network setting is enabled by the user's operation.

On the other hand, if the network function of the accessory device 600 is enabled by the user's operation or the like (YES in step S806), then in step S807, notification of enabling the network function is given to the accessory device 600 by the low-speed SPI communication using the communication line 220.

Thereafter, in step S808, the image apparatus 700 enables the PCI Express, and starts communicating with the accessory device 600 via the high-speed communication line 701. Since the PCI Express allows a high-speed communication, the amount of consumed power tends to be large.

As described above, after the accessory device 600 is attached, by enabling the PCI Express in a low-speed communication in response to the user's operation, it is possible to reduce the power consumption of the image apparatus 700. Thereafter, a large volume of image data that is selected by the user's operation can be communicated by the high-speed communication using the PCI Express.

Figure 9:
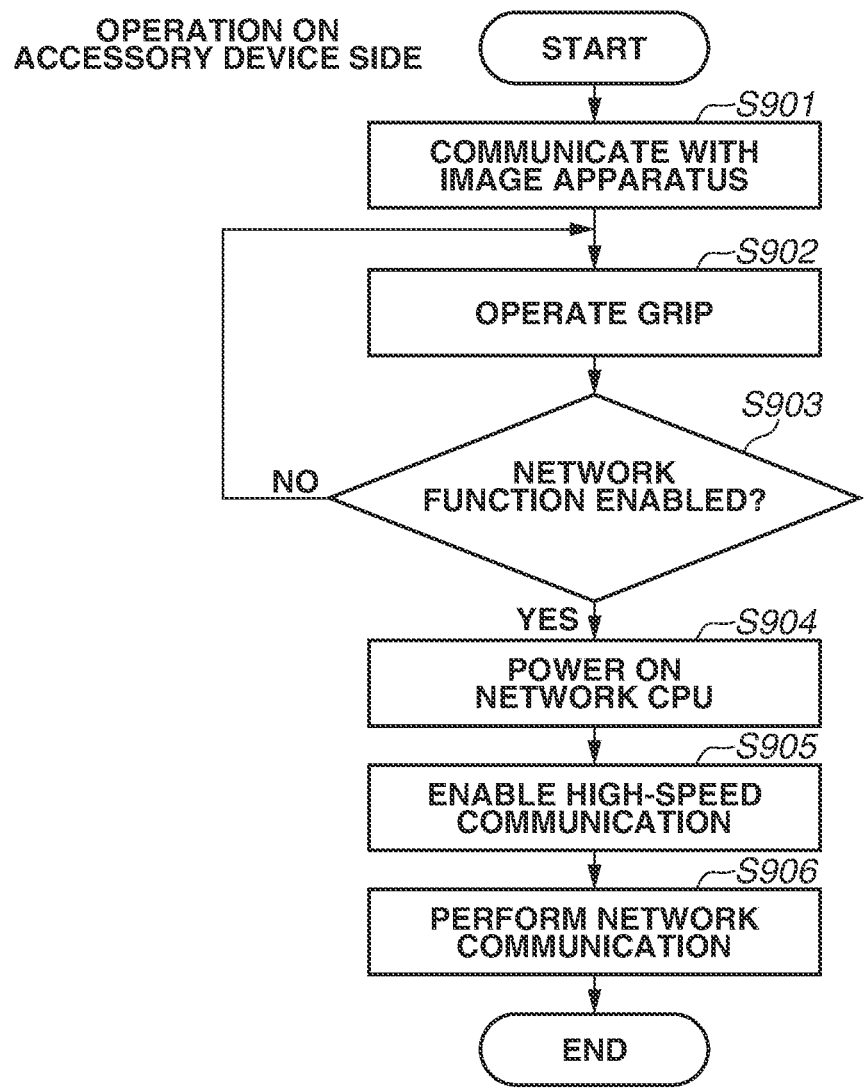
FIG. 9 is a flowchart illustrating an example of operation of the accessory device according to one or more aspects of the present disclosure.

Next, a description will be made on an operation of the accessory device according to the second exemplary embodiment with reference to a flowchart in FIG. 9. FIG. 9 is a flowchart illustrating an example of an operation flow of the accessory device according to the second exemplary embodiment. The processing in the flowchart illustrated in FIG. 9 is initiated when the above-described process in step S404 is completed, and the accessory device 600 is brought into the state of being capable of communicating with the control CPU 201 in the image apparatus 700. Each process in the flowchart illustrated in FIG. 9 is realized when the control CPU 101 loads and executes the program, which is stored in the unillustrated non-volatile memory, and controls each function block.

In step S901, the accessory device 600 carries out the initial communication with the image apparatus 700, and notifies the image apparatus 700 of the model information including the type of the accessory device 600. In the second exemplary embodiment, the accessory device 600 notifies that the accessory device 600 has the network function.

Thereafter, in step S902, the accessory device 600 starts being operated as a battery grip.

In step S903, it is determined whether the network function is enabled. That is, the accessory device 600 is shifted to a state of waiting for a user's operation to enable the network function from the image apparatus 700. The accessory device 600 continues to operate as a battery grip until the accessory device 600 receives the notification of enabling the network function from the image apparatus 700 via the communication line 113.

If it is determined that the network function is enabled (YES in step S903), then in step S904, the control CPU 101 turns on the power supply unit 602. Then, the network CPU 601 that is operated with power from the power supply unit 602 is enabled.

In step S905, the network CPU 601 enables a PCI Express block (high-speed communication) for communicating with the image apparatus 700 via the high-speed signal line 604.

When the communication with the image apparatus 700 using a high-speed communication line is made available, then in step S906, the network CPU 601 enables the network function and carries out the network communication. When the network function is enabled, for example, the image apparatus 700 can communicate with an external network by using the network CPU 601 of the accessory device 600 (WFT). In addition, it is possible to connect to another hard disc or another solid-state drive (SSD) by exclusive control of Wi-Fi and Ether or by using, for example, the above-described PCI Express.

As it has been described above, according to the second exemplary embodiment, the connector that connects the image apparatus and the accessory device is provided with the low-speed communication line and the high-speed communication line in advance, so that it is possible to expand the function of the image apparatus according to the accessory to be connected thereto. In addition, it is determined whether to enable the high-speed communication line after the model information of the accessory device is communicated upon detection of the connection of the accessory device, so that it is possible to execute an appropriate control according to the type of the accessory device. In the case of the accessory device that is not compatible with the high-speed communication line, the power consumption on the accessory device can be reduced. In a case where the accessory device that is compatible with the high-speed communication line is connected, the function of the accessory device can be utilized. Furthermore, since the high-speed communication is enabled in response to the user's operation, the high-speed communication is carried out only when necessary, thereby suppressing wasteful power consumption.

Moreover, even in the case where various types of accessory devices become available after an image apparatus goes on the market, the function of the accessory system can be expanded by the firmware update on the image apparatus side.

It is assumed that the image apparatus according to the second exemplary embodiment is connectable to both of the battery grip illustrated in FIG. 1 and the network function expanding accessory device illustrated in FIG. 6.

The description has been made on the exemplary embodiments of the present disclosure. However, the present disclosure is not limited to the above exemplary embodiments and should appropriately be modified and adopted according to a circuit design to be used within the scope of the technical idea of the present disclosure. For example, the configuration of the image apparatus that has been described as electronic apparatus using an example of a digital camera in the above-described exemplary embodiments is also applicable to a digital still camera or a digital video camera. In addition, apparatuses such as a smartphone and a tablet personal computer (PC), each of which has a function of capturing and recording an image of an object, are included in the image apparatuses.

The configuration of the accessory device attachable to an electronic apparatus which has been described above using an example of a battery grip is also applicable to various accessory devices, such as an electronic flash device, which are capable of supplying power to the electronic apparatus and expanding the function of the electronic apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-232638, filed Dec. 24, 2019, and No. 2020-007825, filed Jan. 21, 2020, which are hereby incorporated by reference herein in their entirety.

What is claimed is:

1. An electronic apparatus connectable to an imaging apparatus and storing a battery, the electronic apparatus comprising:
   a first connection interface that outputs first power from the battery to the imaging apparatus connected to the electronic apparatus;
   a second connection interface that receives second power, which is generated in the imaging apparatus using the first power, from the imaging apparatus, and
   a CPU that operates with the second power received from the imaging apparatus, and then executes a program stored in a memory and performs a communication with the imaging apparatus,
   wherein the second power received from the imaging apparatus is a power source of the CPU.

2. The electronic apparatus according to claim 1, further comprising a plurality of operation members for operating the imaging apparatus,
   wherein the CPU: (1) accepts an operation on an operation member among the plurality of operation members; and (2) outputs a control signal corresponding to the operation member, on which the operation has been performed, to the imaging apparatus.

3. The electronic apparatus according to claim 1, further comprising a plurality of operation members for operating the imaging apparatus,
   wherein, when an operation on a first operation member among the plurality of operation members is performed, the CPU accepts the operation on the first operation member and outputs a control signal corresponding to the operation on the first operation member to the imaging apparatus, and
   wherein, when an operation on a second operation member among the plurality of operation members is performed, a control signal corresponding to the operation on the second operation member is output to the imaging apparatus without control by the CPU.

4. The electronic apparatus according to claim 3, wherein the control signal corresponding to the operation on the second operation member is one of a plurality of control signals that are used for causing the imaging apparatus to execute imaging or imaging preparation and that include an imaging instruction signal, a focusing start signal, and an exposure lock signal.

5. The electronic apparatus according to claim 1, wherein the operation of the CPU with the second power is stopped until the second power is supplied from the imaging apparatus and is started in response to reception of the second power supplied from the imaging apparatus.

6. The electronic apparatus according to claim 1, wherein the electronic apparatus is a battery grip for the imaging apparatus.

7. The electronic apparatus according to claim 1, wherein the CPU does not operate even if the battery is installed in the electronic apparatus in a case where the electronic apparatus is not connected to the imaging apparatus.

8. The electronic apparatus according to claim 1, wherein the second connection interface receives the second power while the first power is being output to the imaging apparatus.

9. The electronic apparatus according to claim 1, wherein the CPU executes the program stored in the memory and performs the communication with the imaging apparatus while the CPU is operating with the second power which is received from the imaging apparatus.

10. An imaging apparatus comprising:
    a first connection interface that receives first power from an electronic apparatus connected to the imaging apparatus,
    wherein the electronic apparatus has a battery and a CPU and supplies the first power from the battery to the first connection interface;
    a second connection interface that supplies second power to the electronic apparatus; and
    at least one processor and/or at least one electronic circuit which executes control to:
    generate the second power using the first power received from the electronic apparatus;
    supply the second power to the electronic apparatus by the second connection interface so that the CPU of the electronic apparatus operates with the second power; and
    communicate with the CPU of the electronic apparatus to which the second power has been supplied after the CPU of the electronic apparatus operates with the second power,
    wherein the second power supplied to the electronic apparatus is a power source of the CPU of the electronic apparatus.

11. The imaging apparatus according to claim 10, further comprising an imaging circuit,
    wherein the at least one processor and/or the at least one electronic circuit further executes control to:
    cause the imaging circuit to execute at least one of imaging and imaging preparation according to a control signal received from the electronic apparatus.

12. The imaging apparatus according to claim 10, wherein the at least one processor and/or at least one electronic circuit starts communication with the electronic apparatus in accordance with a start of supplying the second power.

13. The imaging apparatus according to claim 10, wherein the at least one processor and/or at least one electronic circuit determines a type of the electronic apparatus in accordance with the communication with the CPU of the electronic apparatus.

14. The imaging apparatus according to claim 10, wherein the at least one processor and/or at least one electronic circuit further executes control to:
supply the second power to the electronic apparatus while the first connection interface is receiving the first power from the electronic apparatus.

15. A method for controlling an electronic apparatus storing a battery, comprising:
outputting first power from the battery to an imaging apparatus connected to the electronic apparatus;
receiving second power, which is generated in the imaging apparatus using the first power, from the imaging apparatus; and
causing a CPU of the electronic apparatus to operate with the second power received in the receiving, and then
communicating with the imaging apparatus by the CPU,
wherein the second power received from the imaging apparatus is a power source of the CPU.

16. The method according to claim 15, wherein the operation of the CPU with the second power is stopped until the second power is supplied from the imaging apparatus and is started in response to reception of the second power supplied from the imaging apparatus.

* * * * *